United States Patent
Bodin et al.

(10) Patent No.: US 7,269,832 B2
(45) Date of Patent: Sep. 11, 2007

(54) GENERIC VIRTUAL DEVICE DRIVER

(75) Inventors: William Kress Bodin, Austin, TX (US); Mark Hersey, Austin, TX (US); Jan Rogoyski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 10/661,270

(22) Filed: Sep. 12, 2003

(65) Prior Publication Data

US 2004/0210911 A1   Oct. 21, 2004

Related U.S. Application Data

(62) Division of application No. 09/168,587, filed on Oct. 8, 1998, now Pat. No. 6,760,784.

(51) Int. Cl.
*G06F 9/44* (2006.01)

(52) U.S. Cl. .................................. 719/321; 719/324

(58) Field of Classification Search ........ 719/321–327, 719/310; 710/8, 23; 345/593
See application file for complete search history.

(56) References Cited

U.S. PATENT DOCUMENTS

| | | | |
|---|---|---|---|
| 5,062,060 A | 10/1991 | Kolnick | 364/521 |
| 5,175,855 A | 12/1992 | Putnam et al. | 395/700 |
| 5,307,491 A | 4/1994 | Feriozi et al. | 395/700 |
| 5,394,519 A | 2/1995 | Bodin | 395/131 |
| 5,418,962 A * | 5/1995 | Bodin et al. | 710/8 |
| 5,459,867 A * | 10/1995 | Adams et al. | 719/321 |
| 5,497,494 A | 3/1996 | Combs et al. | 395/750 |
| 5,511,195 A | 4/1996 | Kennedy, Jr. et al. | 395/650 |
| 5,543,822 A * | 8/1996 | Spilo et al. | 345/542 |
| 5,561,791 A | 10/1996 | Mendelson et al. | 395/550 |
| 5,581,766 A | 12/1996 | Spurlock | 395/652 |
| 5,590,342 A * | 12/1996 | Marisetty | 713/324 |
| 5,630,076 A | 5/1997 | Saulpaugh et al. | 395/284 |
| 5,727,221 A * | 3/1998 | Walsh et al. | 713/310 |
| 5,745,724 A * | 4/1998 | Favor et al. | 712/213 |
| 5,752,075 A * | 5/1998 | Kikinis | 710/1 |
| 5,778,226 A * | 7/1998 | Adams et al. | 719/311 |
| 5,806,081 A * | 9/1998 | Swen et al. | 715/528 |
| 5,822,550 A * | 10/1998 | Milhaupt et al. | 710/315 |
| 6,052,743 A | 4/2000 | Schwan et al. | 710/23 |
| 6,084,638 A * | 7/2000 | Hare et al. | 348/552 |
| 6,091,430 A | 7/2000 | Bodin et al. | 345/510 |
| 6,093,213 A * | 7/2000 | Favor et al. | 703/27 |
| 6,112,260 A * | 8/2000 | Colterjohn et al. | 710/31 |
| 6,141,706 A * | 10/2000 | Thornton et al. | 710/21 |
| 6,421,754 B1 * | 7/2002 | Kau et al. | 710/261 |

* cited by examiner

*Primary Examiner*—Van Nguyen
(74) *Attorney, Agent, or Firm*—Duke W. Yee; Jeffrey S. LaBaw; Wayne P. Bailey

(57) ABSTRACT

A method and apparatus provides for handling communications between an application and a device through a device driver. Calls or commands are used by the device driver to access the hardware that are common to a number of different types of devices that are to be handled by the device driver. These calls or commands are used to store or save away information in the device when an application accessing the device shifts into a background state from a foreground state. These commands are used to restore information to the device when the application shifts back into the foreground state from the background state. In addition, a range of I/O ports used to access the devices are identified and predicted. For example, with video adapters, port address ranges are trapped for addresses identified through both PCI and VESA BIOSES.

12 Claims, 17 Drawing Sheets

FIG. 8A

```
/****************************************************************************
 *
 * FUNCTION NAME = vvUserFgndSetMode
 *
 * DESCRIPTION
 *      Save client machine CPU register state
 *      Save video BIOS data area
 *      Setup a VGA (or possibly VESA) BIOS call to set the current
 *      client video mode in order to restore the VDM's state.
 *
 ****************************************************************************/ vvUserFgndSetMode()
{
    /* New art */
    Save client CPU register state
    Save video BIOS data area
    setup VGA (or possibly VESA) BIOS call to set the current
       client video mode
    return to
       vvUserFgndLogicalLineLength
}

/****************************************************************************
 *
 * FUNCTION NAME = vvUserFgndLogicalLineLength
 *
 * DESCRIPTION
 *      Setup a VESA BIOS call to set the logical scan line length
 *      Useful for VESA BIOS not implementing full register restore.
 *
 ****************************************************************************/ vvUserFgndLogicalLineLength()
{
    /* New art */
    inject vesa call to restore
    logical scan length start registers from saved area
    return to
       vvUserFgndDisplayStart,
}

/****************************************************************************
 *
 * FUNCTION NAME = vvUserFgndDisplayStart
 *
 * DESCRIPTION
 *      Setup a VESA BIOS call to set the display start registers
 *      inserts the int 10 instruction, and arms a return to
 *      vvUserFgndBankCopy.
 *
 ****************************************************************************/ vvUserFgndDisplayStart()
{
    /* New art */
    inject vesa call to restore display start registers from saved area
    return to
       vvUserFgndRegsSet,
}
```

```
/********************************************************************
 *
 * FUNCTION NAME = vvUserFgndRegsSet
 *
 * DESCRIPTION
 *       Setup a VESA BIOS call to restore the clients adapter registers
 *
 ********************************************************************/
vvUserFgndRegsSet()
{
  /* New art */
  inject vesa call to restore client adapter registers from saved area
  return to
     vvUserFgndBankSet1st,
}

/********************************************************************
 *
 * FUNCTION NAME = vvUserFgndBankSet1st
 *
 * DESCRIPTION
 *       Setup a VESA BIOS call to set the VRAM bank number to 0;
 *
 ********************************************************************/
vvUserFgndBankSet1st()
{
  /* New art */
     if( Mode uses Linear Frame Buffer )
        transfer LINEAR buffer contents to VRAM from saved area
        inject vesa call to set A Bank to saved A bank
        return to
           vvUserFgndBankBSet,
     else
        pvd->VdmUser.lBankCopyNextBank = 0;
        inject vesa call to set A Bank to next bank # for restore
        return to
           vvUserFgndBankCopySetBBank,
}

/********************************************************************
 *
 * FUNCTION NAME = vvUserFgndBankCopySetBBank
 *
 * DESCRIPTION
 *       Set the B Bank Window if it is needed for read/write operations.
 *       Most adapters only have an A Bank.
 *       A few have an A Bank for reading and a B Bank for writing,
 *       or vice versa.
 *
 ********************************************************************/
vvUserFgndBankCopySetBBank()
{
  /* New art */
  inject vesa call to set B Bank to next bank # for restore
  return to
     vvUserFgndBankCopy,
}
```

```
/*****************************************************************
 *
 * FUNCTION NAME = vvUserFgndBankCopy
 *
 * DESCRIPTION
 *      Transfers virtual memory to the VRAM bank,
 *      and then setup a VESA BIOS call to access the next A bank.
 *
 *      On the last pass, it does the transfer of virtual memory to the VRAM
 *      bank, and then setup a VESA BIOS call to set the bank
 *      number to the clients current A bank number.
 *
 *****************************************************************/
vvUserFgndBankCopy()
{
    /* Prior art */
    transfer one (current) bank of VRAM from saved area
    /* New art */
    increment bank number
    if( copy bank < total banks )
        inject vesa call to set A Bank to next bank # for restore
        return to
        vvUserFgndBankCopySetBBank,
    else
        inject vesa call to set A Bank to client bank #
        return to
        vvUserFgndBankBSet,
}
```  ⎫
   ⎬ 812
   ⎭

```
/*****************************************************************
 *
 * FUNCTION NAME = vvUserFgndBankBSet
 *
 * DESCRIPTION
 *      Setup a VESA BIOS call to set the B bank
 *      number to the clients current bank number.
 *      Most adapters only have an A Bank.
 *      A few have an A Bank for reading and a B Bank for writing,
 *      or vice versa.
 *      Useful for VESA BIOS not implementing full register restore.
 *
 *****************************************************************/
vvUserFgndBankBSet()
{
    inject vesa call to set B Bank to saved bank #
    return to
        vvUserFgndRegsSetAtEnd,
}
```  ⎫
   ⎬ 814
   ⎭

```
/*****************************************************************
 *
 * FUNCTION NAME = vvUserFgndRegsSetAtEnd
 *
 * DESCRIPTION
 *      Setup a VESA BIOS call to restore the client adapter
 *      register set to clean up the registers changed
 *      during the restoring the VRAM banks.
 *
 *****************************************************************/
vvUserFgndRegsSetAtEnd()
{
    inject vesa call to restore registers from saved state
    return to FgndFinish
}
```  ⎫
   ⎬ 816
   ⎭

FIG. 8D

```
/**********************************************************************
 *
 * FUNCTION NAME = vvUserFgndFinish
 *
 * DESCRIPTION
 *      Finish foreground switch in VDM's context.
 *      Restore the VGA register state directly.
 *      Useful for VESA BIOS not implementing full register restore.
 *      Restore client machine CPU register state saved
 *      Restore video BIOS data area saved
 *      Switch trapping behavior to transparent real hardware access.
 *
 **********************************************************************/
vvUserFgndFinish()
{
    /* Prior art */
    restore VGA register state
    /* New art */
    restore client machine CPU register state saved
    restore video BIOS data area saved
    /* Prior art */
    switch trapping behavior to transparent real hardware access
    thaw VDM when in unemulatable (SVGA) video mode.
}
```
⎬ 818

FIG. 9B

```
/****************************************************************************
 *
 * FUNCTION NAME = vvUserBgndLogicalLineLength
 *
 * DESCRIPTION
 *     Setup a VESA BIOS call to get the clients VRAM bank number.
 *
 ****************************************************************************/
vvUserBgndLogicalLineLength()
{
    /* New art */
    Setup a VESA BIOS call to get the clients VRAM bank number.
    return to
        vvUserBgndDisplayStart,
}
/****************************************************************************
 *
 * FUNCTION NAME = vvUserBgndDisplayStart
 *
 * DESCRIPTION
 *     Save returned logical line length values.
 *     Setup a VESA BIOS call to get the clients display start offset.
 *
 ****************************************************************************/
vvUserBgndDisplayStart()
{
    /* New art */
    Save returned logical line length values.
    Setup a VESA BIOS call to get the clients display start offset.
    return to
        vvUserBgndBankGet,
}
/****************************************************************************
 *
 * FUNCTION NAME = vvUserBgndBankGet
 *
 * DESCRIPTION
 *     Save returned display start values.
 *     Setup a VESA BIOS call to get the clients VRAM A bank number.
 *
 ****************************************************************************/
vvUserBgndBankGet()
{
    /* New art */
    Save returned display start values.
    Setup a VESA BIOS call to get the clients VRAM A bank number.
    return to
        vvUserBgndBankBGet,
}
```

904 — vvUserBgndLogicalLineLength
906 — vvUserBgndDisplayStart
908 — vvUserBgndBankGet

FIG. 9C

```
/*******************************************************************************
 *
 * FUNCTION NAME = vvUserBgndBankBGet
 *
 * DESCRIPTION
 *       Save returned A bank number.
 *       Setup a VESA BIOS call to get the clients VRAM B bank number.
 *
 *******************************************************************************/
vvUserBgndBankBGet()
{
   /* New art */
   Save returned A bank number.
   set current copy bank to -1
   Setup a VESA BIOS call to get the clients VRAM B bank number.
   return to
       vvUserBgndBankCopy
}                                                               /*@V4.0JAN01*/
/*******************************************************************************
 *
 * FUNCTION NAME = vvUserBgndBankCopy
 *
 * DESCRIPTION
 *       On the 1st pass,
 *           Save returned client B bank number.
 *           Setup a VESA BIOS call to set the VRAM bank number to 0.
 *
 *       On all middle passes,
 *           Transfers the VRAM bank to virtual storage,
 *           Setup a VESA BIOS call to access the next VRAM bank.
 *
 *       On the last pass,
 *           Transfers the last VRAM bank to virtual storage,
 *           Setup a BIOS call to set VGA mode via vvUserBgndVGAModeSet
 *
 *******************************************************************************/
vvUserBgndBankCopy()
{
   /* New art */
   if( copy bank < 0 )
     save returned client B bank number
   else
     /* Prior art */
     transfer one VRAM bank to saved area
   /* New art */
   if( mode uses Linear Frame Buffer )
     transfer whole linear buffer to save area
     return to
        vvUserBgndVGAModeSet
   else
     increment copy bank number
     if( copy bank number < total banks )
       setup a VESA call to set copy A bank number.
       return to
           vvUserBgndBankCopySetBBank,
     else
       call vvUserBgndVGAModeSet directly
}
```

```
/*******************************************************************************
 *
 * FUNCTION NAME = vvUserBgndBankCopySetBBank
 *
 * DESCRIPTION
 *       Setup VESA BIOS call to set the copy B Bank Window,
 *       if it is needed for read/write operations.
 *
 *******************************************************************************/
vvUserBgndBankCopySetBBank()
{
  /* New art */
  Setup VESA BIOS call to set the copy B Bank Window,
  return to
      vvUserBgndBankCopy
}
```
⎫
⎬ 916
⎭

```
/*******************************************************************************
 *
 * FUNCTION NAME = vvUserBgndVGAModeSet
 *
 * DESCRIPTION
 *       Setup a VGA BIOS call to set a VGA standard video mode (mode 12).
 *       This allows next operating system component manipulating the
 *       video hardware to assume the SVGA is a simple/standard VGA.
 *
 *******************************************************************************/
vvUserBgndVGAModeSet()
{
  /* New art */
  setup a VGA BIOS call to set a VGA standard video mode.
  return to vvUserBgndFinish
}                                                              /*@V4.0JAN01*/
```
⎫
⎬ 918
⎭

```
/*******************************************************************************
 *
 * FUNCTION NAME = vvUserBgndFinish
 *
 * DESCRIPTION
 *       Finish background switch in VDM's context
 *       Freeze VDM when in unemulatable (SVGA) video mode.
 *       Leave emulatable (VGA) video mode unfrozen.
 *
 *******************************************************************************/
vvUserBgndFinish()
{
  /* New art */
  restore client CPU register state
  /* Prior art */
  switch trapping behavior to emulation of hardware access
  freeze VDM when in unemulatable (SVGA) video mode.
}
```
⎫
⎬ 920
⎭

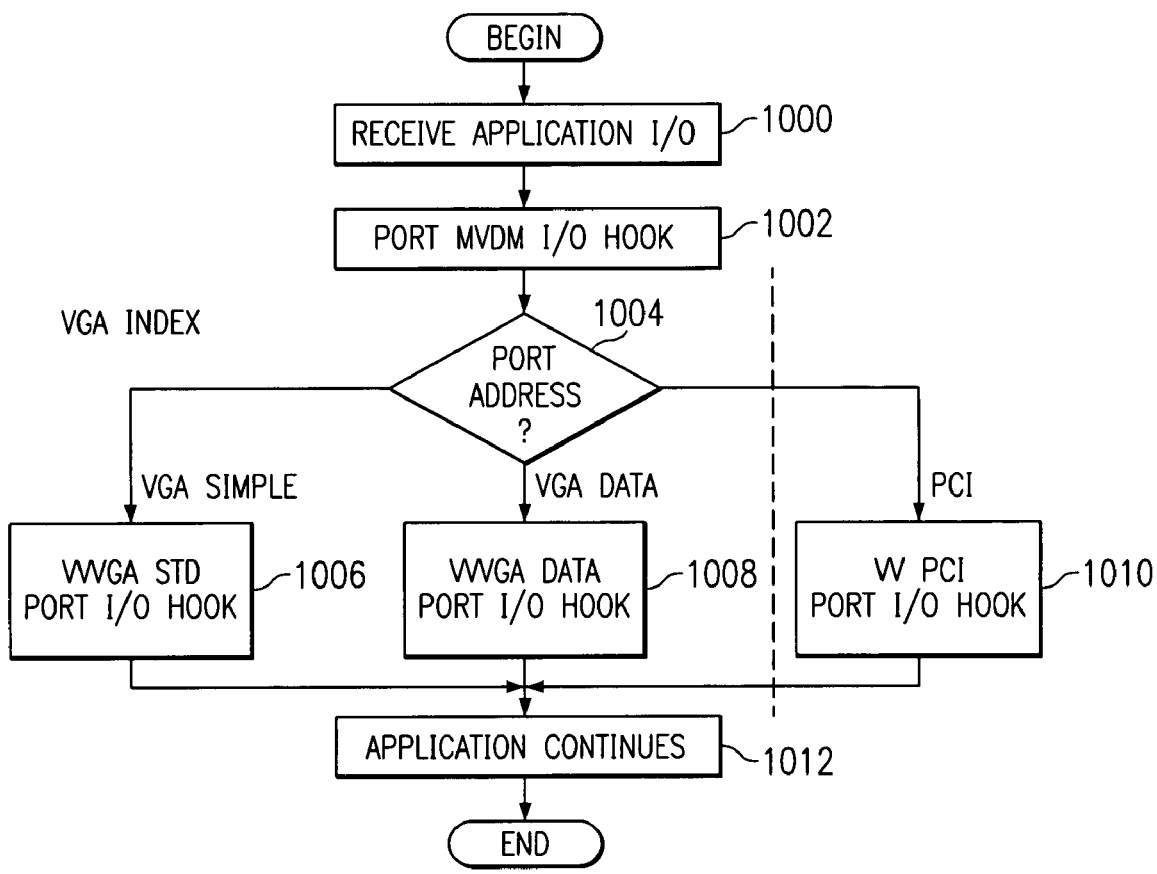

FIG. 11A

```
/*******************************************************************************
 *
 * FUNCTION NAME = vvInit
 *
 * DESCRIPTION
 *      Initialization for virtual video driver
 *      called by mvdm at start of each VDM
 *      Most VESA BIOSes now provide PCI BIOS information too
 *
 *******************************************************************************/
vvInit()
{
   /* Prior art: */
   register standard VGA I/O port address handlers with mvdm.
   /* New art: */
   make PCI BIOS call to get list of PCI BIOS I/O port addresses.
   for each PCI BIOS I/O port address
      register PCI BIOS I/O port address handler with mvdm.
}

;/*******************************************************************************
;*
;* FUNCTION NAME = mvdmIOHook
;*
;* DESCRIPTION
;*      All client I/O instructions generate a hardware trap which comes here
;*      Handlers are generally all registered at the start of the VDM.
;*      Video port hooking is enabled in the background,
;*      and disabled in the foreground.
;*      Non-video hardware follows other algorithms based on the
;*      device driver requirements and sophistication.
;*
;*******************************************************************************/
mvdmPortIOHook()
{
   /* All prior art */
   if( registered handler for I/O port address
         && hooking enabled for I/O port address )
      call registered handler for I/O port address
   else
      do I/O directly.
}

/*******************************************************************************
 *
 * FUNCTION NAME = vvVGAStandardPortIOHook
 *
 * DESCRIPTION
 *      Typical registered hook handler for VGA Standard I/O port address
 *      May be more complicated if I/O port not connected to a simple register
 *      Such as pair of I/O ports for an index and data register array
 *      Each I/O port address may have its own unique and differently
 *      coded handler to handle unusually behaving ports.
 *
 *******************************************************************************/
vvVGAStandardPortIOHook()
{
   /* All prior art */
   if( input )
      return ( emulation state variable value for I/O port address )
      /* This goes into the client CPU register set */
   else /* output */
      Save output from client CPU register set
      into emulation state variable for I/O port address
      /* Will be used later to restore adapter contents */
      Adjust any other emulation state variables required by changes to this port
}
```

```
/*****************************************************************************
 *
 * FUNCTION NAME = wVGADataPortIOHook
 *
 * DESCRIPTION
 *      Typical registered hook handler for VGA Standard I/O port address
 *      as a part of index and data port handler pair.
 *      Index port handler is usually a wVGAStandardPortIOHook.
 *
 *****************************************************************************/
wVGADataPortIOHook()
{
    /* All prior art */
    if( input )
       return ( emulation state variable [index port state variable]
                 value for I/O port address )
       /* This goes into the client CPU register set */
    else /* output */
       Save output from client CPU register set
       into emulation state variable [index port state variable]
          for I/O port address
       /* Will be used later to restore adapter contents */
       Adjust any other emulation state variables required by changes to this port
}
```
⎫
⎬ 1106
⎭

```
/*****************************************************************************
 *
 * FUNCTION NAME = wPCIPortIOHook
 *
 * DESCRIPTION
 *      Registered by the virtual video device driver for a list
 *      of port addresses provided by the PCI BIOS.
 *      ONLY registered hook handler type for PCI BIOS I/O port address.
 *      This represents a simple best guess to how a typical port works.
 *      But it often does not absolutely correct emulation.
 *      However it almost always suffices for emulating VGA modes.
 *      This is NOT true of SVGA modes,
 *      and this is why we freeze when in VESA modes in the background
 *      so that the video adapter is not incorrectly emulated.
 *      Emulation state variables used here
 *      will NOT be used later to restore adapter contents,
 *      because we do not know how port really works!
 *      Instead we rely on the VESA BIOS calls to restore important registers.
 *
 *****************************************************************************/
wPCIPortIOHook()
{
    /* New art */
    if( input )
       return ( emulation state variable value for I/O port address )
       /* This goes into the client CPU register set */
    else /* output */
       save output from client CPU register set
       into emulation state variable for I/O port address
```
⎫
⎬ 1108
⎭

FIG. 12A

```
;/*******************************************************************************
;*
;* FUNCTION NAME = wInt10PreHook
;*
;* DESCRIPTION
;*     Quick Return if not Mode Set,
;*     else transfer control to
;*
;*******************************************************************************/
wInt10PreHook()
{
    if( AH( pcrf ) == 0x00)  /* VGA Mode Set */
    {
        /* Prior art */
        save client registers as last setmode registers
        wInt10Chain
    }
    else if( AX( pcrf ) == 0x4F02 )  /* VESA Mode Set */
    {
        /* Prior art: */
        save client registers as last setmode registers
        /* From here begins new art: */
        save VESA setmode number
        push client registers
        inject VESA call to get VESA BIOS SVGA INFO.
        return to wInt10VesaVbeInfoReturn
    }
    else
        /* Prior art */
        wInt10Chain
}                                                                            ⎫
                                                                             ⎬ 1200
/*******************************************************************************
*
* FUNCTION NAME = wInt10VesaVbeInfoReturn
*
* DESCRIPTION
*     Sets up for a VESA Mode query.
*
*******************************************************************************/
wInt10VesaVbeInfoReturn()
{
    save VESA BIOS SVGA INFO including total VRAM size.
    inject VESA BIOS call to get MODE INFO for new mode.
    return to
        wInt10VesaModeInfoReturn
}                                                                            ⎫ 1202

/*******************************************************************************
*
* FUNCTION NAME = wInt10VesaModeInfoReturn
*
* DESCRIPTION
*     Gets the VESA mode information from the Mode information block and
*     copies it to the VDM's VESA mode information structure, and then
*     sets up to do the actual VESA BIOS mode set to the VESA mode.
*
*******************************************************************************/
VOID HOOKENTRY wInt10VesaModeInfoReturn()
{
    pop client registers
    save current mode info as old mode info
    save VESA BIOS MODE INFO as current mode info
       ( includes mode dimension info )
    inject original setmode call to original VESA BIOS INT 10 handler
    return to
        wInt10VesaEndReturn
}                                                                            ⎫ 1204
```

```
/************************************************************
 *
 * FUNCTION NAME = wInt10VesaEndReturn
 *
 * DESCRIPTION
 *     Does the post cleanup after the VESA BIOS mode set.
 *
 ************************************************************/
wInt10VesaEndReturn()
{
   if( AX( pcrf ) != VESA_FUNCTION_SUCCESS )
      restore current mode info from old mode info
   else if( background )
      freeze VDM
   wInt10Continue
}

/************************************************************
 *
 * FUNCTION NAME = wInt10Chain
 *
 * DESCRIPTION
 *     Continue with client INT 10
 *
 ************************************************************/
wInt10Chain()
{
   call original (VGA/VESA) BIOS INT 10 handler
   return to wInt10Continue
}

/************************************************************
 *
 * FUNCTION NAME = wInt10Continue
 *
 * DESCRIPTION
 *     return to client program
 *
 ************************************************************/
wInt10Continue()
{
   return to client program
}
```

*FIG. 12B*

```
/****************************************************************************
 *
 * FUNCTION NAME = vvDsvModeUpdate
 *
 * DESCRIPTION
 *      Determine current mode dimensions
 *      These dimensions are used to determine:
 *      A) How much VRAM to save and restore for emulation switching
 *      B) How to draw current VRAM contents as a picture in a desktop window
 *
 ****************************************************************************/
vvDsvModeUpdate()
{
    if ( VESA MODE )
      /* New art: */
      calculate mode dimensions from info returned by previous VESA calls
        (current mode info)
    else
      /* Prior art */
      calculate mode dimensions from standard VGA registers
}
```
⎫
⎬ 1214
⎭

FIG. 12C

GENERIC VIRTUAL DEVICE DRIVER

This application is a divisional of application Ser. No. 09/168,587, filed Oct. 8, 1998, which issued as U.S. Pat. No. 6,760,784 on Jul. 6, 2004, and which is herein incorporated by reference.

BACKGROUND OF THE INVENTION

1. Technical Field

The present invention relates generally to an improved data processing system and in particular to a method and apparatus for providing communication between an application and a device. Still more particularly, the present invention provides a method and apparatus for providing communication between an application and a device using a device driver.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

With the proliferation of graphic chips sets, video subsystems, graphics cards, etc., it has become necessary to write highly device specific code or device drivers to support these hardware subsystems on various operating system platforms. Writing, maintaining, and distributing these device specific software drivers is expensive and problematic. For example, when a complete video device driver is unavailable for a specific super-VGA (SVGA) video adapter, standard VGA virtual video support (VVGA.SYS) is employed. The current VGA virtual video support allows instructions of disk operating system (DOS) or Windows OS/2 (WINOS/2) programs running in the background or in a window on SVGA video adapters to "bleed through", which means to "actually affect the real hardware". The current VGA virtual video support also does not correctly draw SVGA video modes in a window.

A VGA device is a video adapter that duplicates all of the video modes of the enhanced graphics adapter (EGA) while adding several more video modes. A WINOS/2 program is a program that runs within a WINOS2 session, which is a session created by the OS/2 operating system, that supports the independent processing of programs that are compatible with Microsoft Windows. The OS/2 operating system is the IBM Operating System/2, available from International Business Machines Corporation. The application in such a situation may adjust registers in the adapter, which control the display of the Presentation Manager desk top. Presentation Manager is the interface of the OS/2 operating system that presents, in windows, a graphics-based interface to applications and files installed and running under the OS/2 operating system. This situation is both undesirable and unexpected by many users. The effects of programs actually affecting the hardware include, for example, a black or otherwise corrupted presentation manager display. In addition, the operating system may hang, at such times as during the initial "virtualized" video mode set, which happens when a DOS window or a DOS Full Screen Session (FS) is in the background.

Another disadvantage of the VGA virtual video support is its inability to save and restore Super VGA "VESA standard" video modes or to correctly draw them in a window. An SVGA adapter is an adapter following a video standard established by VESA to provide high-resolution color display on IBM-Compatible computers. Although SVGA is a standard, compatibility problems often occur within the video BIOS because of differences in design by various manufacturers.

Therefore, it would be advantageous to have an improved method and apparatus for allowing various applications to run in the foreground, background, or in a window and switch back and forth without effecting the appearance of the DOS or WIN OS/2 application or the desk top itself regardless of the video mode or adapter resources used by the application.

SUMMARY OF THE INVENTION

The present invention provides a method and apparatus for handling communications between an application and a device through a device driver. Calls or commands are used by the device driver to access the hardware that are common to a number of different types of devices that are to be handled by the device driver. These calls or commands are used to store or save away information in the device when an application accessing the device shifts into a background state from a foreground state. These commands are used to restore information to the device when the application shifts back into the foreground state from the background state. In addition, a range of I/O ports used to access the devices are identified and predicted.

For example, with video adapters, an extended basic adapter type "Generic SVGA" with fixed port addresses beyond the basic adapter type "VGA standard", and additional variable port address ranges identified through PC BIOS calls is described.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A-8D are illustrations of pseudo code employed in a device driver when an application switches to the foreground;

FIGS. 9A-9D are illustrations of pseudo code employed in a device driver when an application switches to the background;

FIG. 10 is a high level flowchart of a process for capturing I/O ports in accordance with a preferred embodiment of the present invention;

FIG. 11 is shown below in FIGS. 11A-11B, which are diagrams of pseudo code used to capture port addresses in accordance with a preferred embodiment of the present invention; and FIG. 12A-12C are diagrams of pseudo code used to set modes in accordance with a preferred embodiment of the present invention.

DETAILED DESCRIPTION OF THE PREFERRED EMBODIMENT

Figure 1:
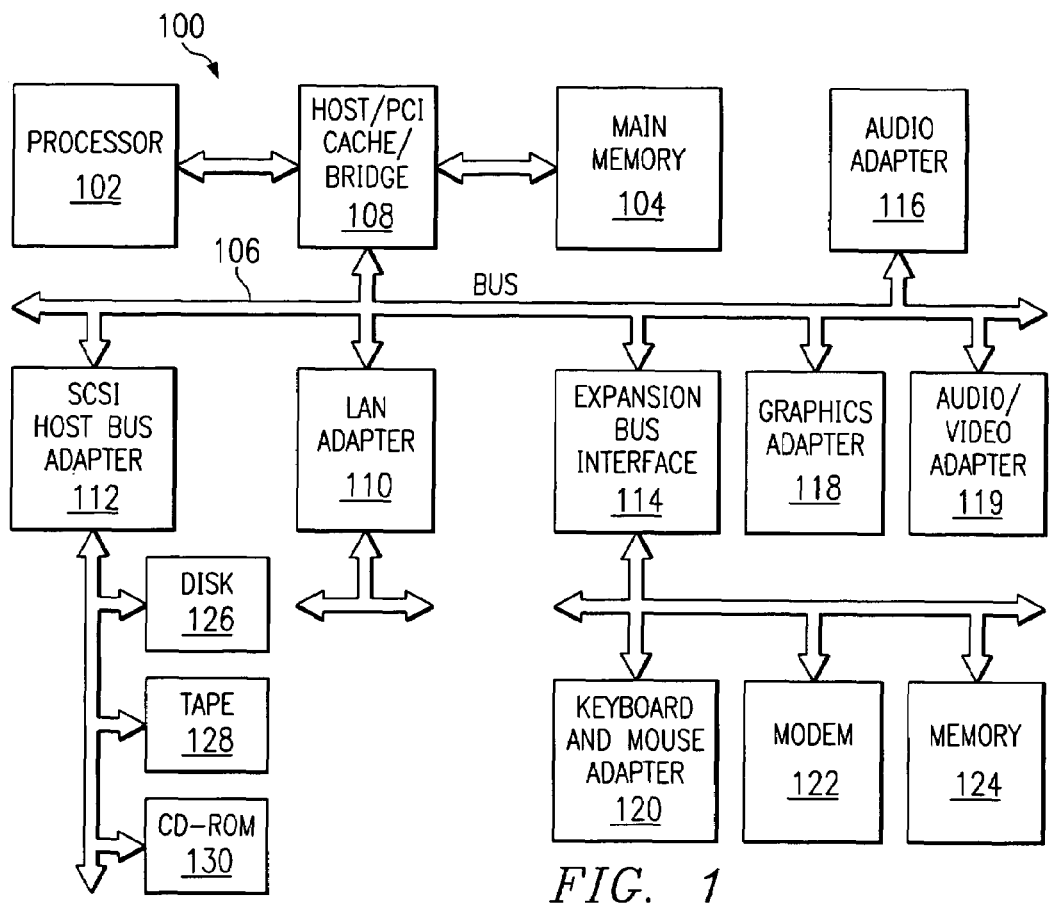
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides a system, method, and computer readable medium for handling communications between an application and a device. A "device" is a generic term for a computer subsystem. Printers, serial ports, displays, and disk drives are often referred to as devices. These subsystems frequently require their own controlling software, called device drivers. A "device driver" is a software component that permits a computer system to communicate with a device. In particular, the present invention provides device drivers that are capable of handling many different types of devices.

More specifically, a device driver, in a computer readable medium, suitable for communication with a plurality of different devices is provided. The plurality of different devices conform to a standard. The device driver includes a saving mechanism responsive to an application that accesses a device within the plurality of different devices transitioning to a background mode, for saving state information from within the device using commands conforming to the standard for the plurality of different devices. In addition, a restoring mechanism, responsive to the application transitioning from the background mode to a foreground mode, for restoring the saved state information back into the device using commands conforming to the standard of the plurality of different devices is present.

The state information may include untyped memory buffers of varying size and number to allow for differing aspects between devices within the plurality of different devices. The device driver may include emulated memory and registers and wherein at least a portion of the state information saved by the saving mechanism, relating to a basic device type, is saved into a portion of the emulated memory and registers, and wherein the device driver further includes a trapping mechanism for trapping input/output calls, from an application running in a background mode, in which changes attempted to the device memory and registers of the device are made instead to the emulated memory and registers, and those changes relating to the basic device type, are subsequently restored to the device by the restoring means from the emulated memory and registers.

The depicted examples are directed towards a video device driver that is able to handle many types of graphics adapters. The processes of the present invention employ hardware commands made from the device driver to the hardware on a device, such as a video adapter. "Hardware commands" are commands used to manipulate data in a device or query the device for information about the state of the device or the capability of the device. Hardware commands may be used to set, copy, or otherwise alter registers and data in memory of a video adapter. For example, hardware commands can be used to save or restore information on a video adapter or to set modes for the video adapter. In the depicted example, the hardware commands are in form BIOS calls made to the video adapter. The BIOS calls are those that are common to a number of different types of video adapters.

Figure 2:
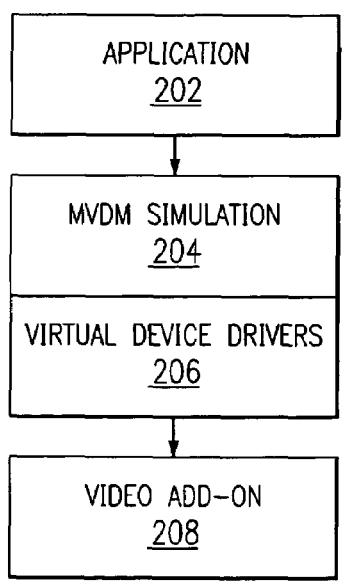
FIG. 2 is a diagram of components in a data processing system used in handling communications between an application and device in accordance with a preferred embodiment of the present invention.

With reference now to FIG. 2, a diagram of components in a data processing system used in handling communications between an application and device is depicted in accordance with a preferred embodiment of the present invention. In the depicted example, data processing system 200 includes an application 202, a multiple virtual DOS machine (MVDM) simulation 204, virtual device drivers 206, and video adapter 208. SVGA video adapter 208 is a graphics adapter, such as graphics adapter 118 in FIG. 1. SVGA video adapter 208 contains the hardware and BIOS needed to display images on a display. Application 202, MVDM simulation 204, and virtual device drivers 206 are located within memory, such as main memory 104 in FIG. 1. In the depicted example, a virtual device driver is software in the operating system (e.g., OS/2) that manages a hardware or software resource. MVDM simulation 204 is part of the operating system and sits between an application and video hardware.

Figure 3:
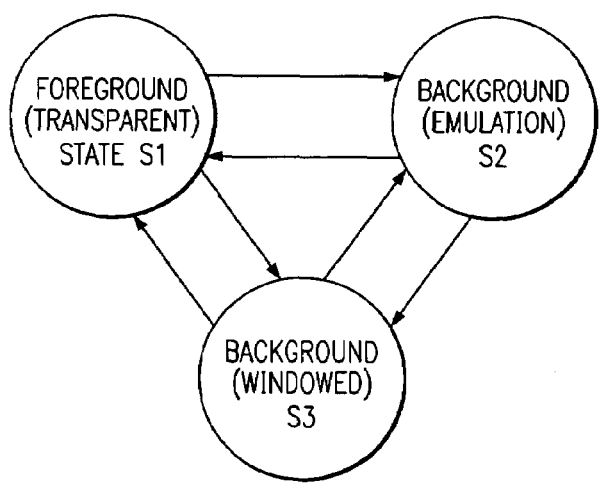
FIG. 3 is a state diagram of a virtual device driver in accordance with a preferred embodiment of the present invention.

Turning now to FIG. 3, a state diagram of a virtual device driver is depicted in accordance with a preferred embodiment of the present invention. Each virtual device driver has three states: a foreground (transparent) state S1, and a background (emulation) state S2, and a background (windowed) state S3. When an application such as application 202 in FIG. 2 is "full screen" or in the foreground, the application "owns" the hardware and the virtual device driver operates in transparent state S1 with respect to application 202. When an application is in the foreground, the application has control of the system in response to various commands issued by the user. In the depicted example, application 202 is in a foreground mode and has control of SVGA video adapter 208. Instructions and commands to SVGA video adapter 208 are sent from application 202 in a transparent manner using MVDM simulation 204 and a virtual video device driver in virtual device drivers 206.

When an application is in the background or its window is minimized, the virtual device driver shifts into background (emulation) state S2. Processes or tasks that are part of the operating system or program are in the background when the processes or tasks are operating while the user is working on another task. Background processes or tasks are assigned a lower priority on a microprocessor's allotment of time than those in the foreground and may be invisible to the user unless the user requests an update or brings the task to the foreground.

From the foreground (transparent) state S1, an application also may transition into a background (windowed) state S3 in which a window for the application is still present on the screen, but the application is executing in a background mode. In background (windowed) state S3, dimension information that may be provided by the VESA BIOS is needed to properly display the application in the window. Most of this information is obtained when the VESA video mode is first set with a VESA BIOS call.

Figure 4:
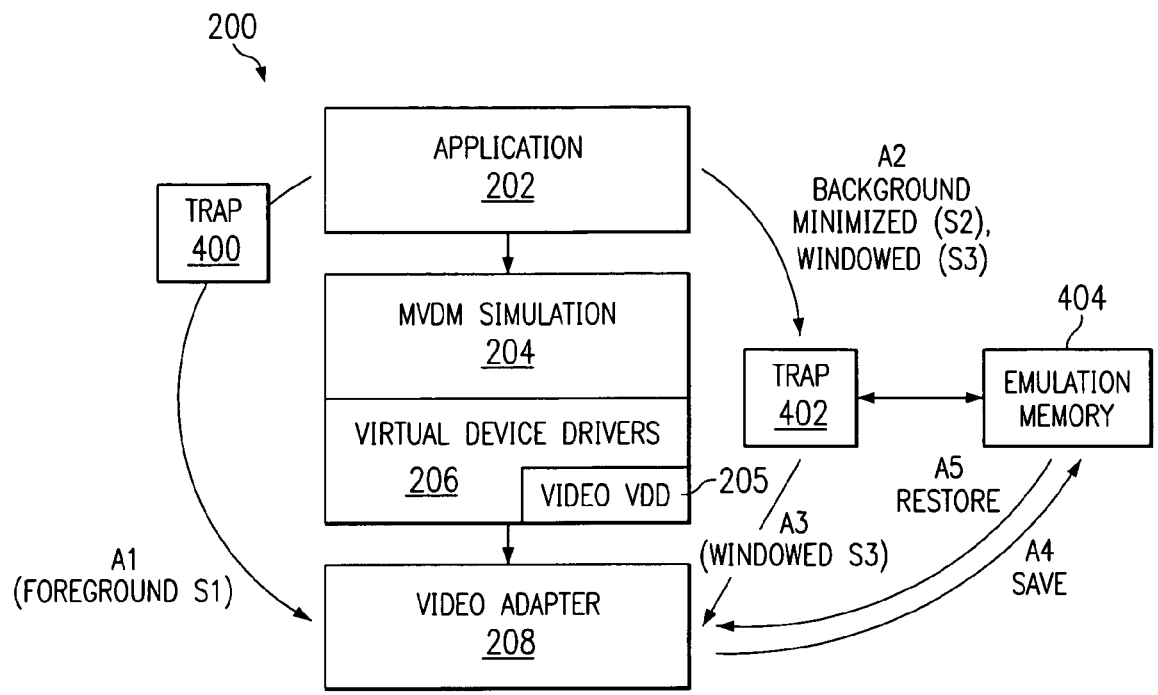
FIG. 4 is a diagram of a data processing system used in handling communications between an application and device in which the application is in a background mode in accordance with a preferred embodiment of the present invention.

With reference now to FIG. 4, a diagram of a data processing system used in handling communications between an application and device in which the application is in a background mode is depicted in accordance with a preferred embodiment of the present invention. In FIG. 4, if application 202 is a foreground mode, the virtual video device driver (VDD) 205 within virtual device drivers 206 that handles communications between application 202 and video adapter 208 is in a foreground (transparent) state S1. In this state, trap 400 is employed by virtual video device driver 205 to handle communications between the application and video adapter 208 through path A1. When application 202 is minimized or windowed in a background mode, virtual video device driver 205 handling communications between application 202 and SVGA video adapter 208 is in background (emulation) state S2 or background (windowed) state S3. In this state, trap 402 is employed to selectively prevent application 202 from controlling hardware, such as SVGA video adapter 208 through paths A2-A3. Traps are set up for all I/O by the MVDM. Device drivers register with the MVDM to receive selected traps by address.

Trap 400 is a direct trap, which allows commands or instructions for application 202 to reach video adapter 208. Trap 400 represents behavior that occurs in the foreground while trap 402 represents behavior that occurs in the background. Trap 402 is an emulation trap, which intercepts commands and instructions from application 202 through path A2, and prevents reaching the hardware in the video adapter. Trap 402 traps I/O ports with known addresses along with identification of additional port addresses provided by the PCI BIOS. Trap 402 may send information or commands to video adapter 208 to update the display in a window through path A3 if application 202 is in background (windowed) state S3. Through path A3, standard VGA video modes or SVGA modes that are described by the VESA BIOS are correctly drawn in a window.

In addition, trap 402 is used to store away or save changes to the state of the emulated SVGA video adapter 208 for later use when application 202 shifts from the background mode to the foreground mode through path A5. Trap 402 saves the state of the adapter into emulation memory 404. The state of the adapter may include registers and the contents of any memory located on the adapter. Trap 402 also includes emulations of various registers and memory within SVGA video adapter 208 by the device driver. As a result, commands and instructions from application 202 affect the registers and memory emulated by trap 402. Emulation of each device is done by the corresponding device driver. Responses are returned by trap 402 to application 202. This response is provided by the device driver sometimes directly from emulated memory and other times by calculation. When the application is brought into the foreground, the emulated registers and memory areas are restored to SVGA video adapter 208 through path A5. Inversely, the present state of SVGA video adapter 208 is saved with respect to the application that was previously in the foreground, through path A4.

Figure 5:
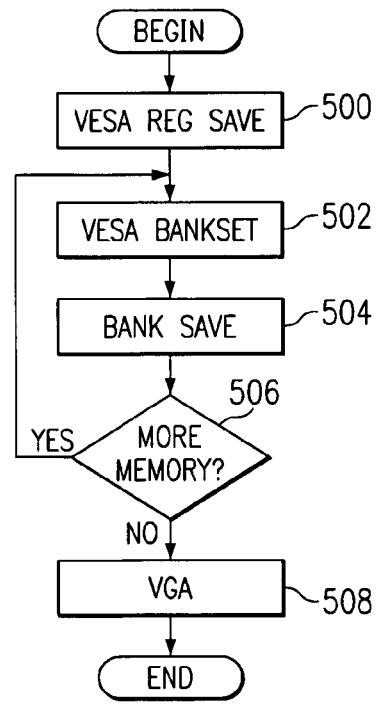
FIG. 5 is a flowchart of a process for saving the state of a virtual video device driver in accordance with a preferred embodiment of the present invention.
Figure 9A:

Turning now to FIG. 5, a high level flowchart of a process for saving the state of a virtual video device driver is depicted in accordance with a preferred embodiment of the present invention. This process is used by the virtual video device driver to save data into a memory or some storage device for use when the virtual video device driver is in an emulation state. A more detailed explanation of the process in FIG. 5 is found in FIG. 9, which provides pseudo code for this process that may be used to generate C code by one of ordinary skill in the art.

Still referring to FIG. 5, the process begins by performing a Video Electronics Standards Association (VESA) register save (step 500). This step employs BIOS calls to the adapter from the virtual video device driver to save the registers in the graphics adapter. The calls made in this step are standard calls that may be found in most video adapters. VESA is an organization hardware manufacturers and vendors dedicated to drafting and improving standards on video and multiple media devices.

Next, a VESA bank set is performed (step 502). This step is performed to set or move a 64K window in the memory of the video adapter to a portion of the memory in the adapter that has not been saved. Under present graphics adapter standards, only 64K of memory may be accessed at any one time. Typically, 256K of video random access memory (VRAM) is present for video graphics adapters (VGA) and 2 megabytes or more VRAM are present for Super Video Graphics Array (SVGA) graphics adapters. As a result, accessing of memory greater than 64K is currently accomplished by using a 64K window to access a "bank" within the VRAM with the window being shifted through bank setting commands.

Figure 6:
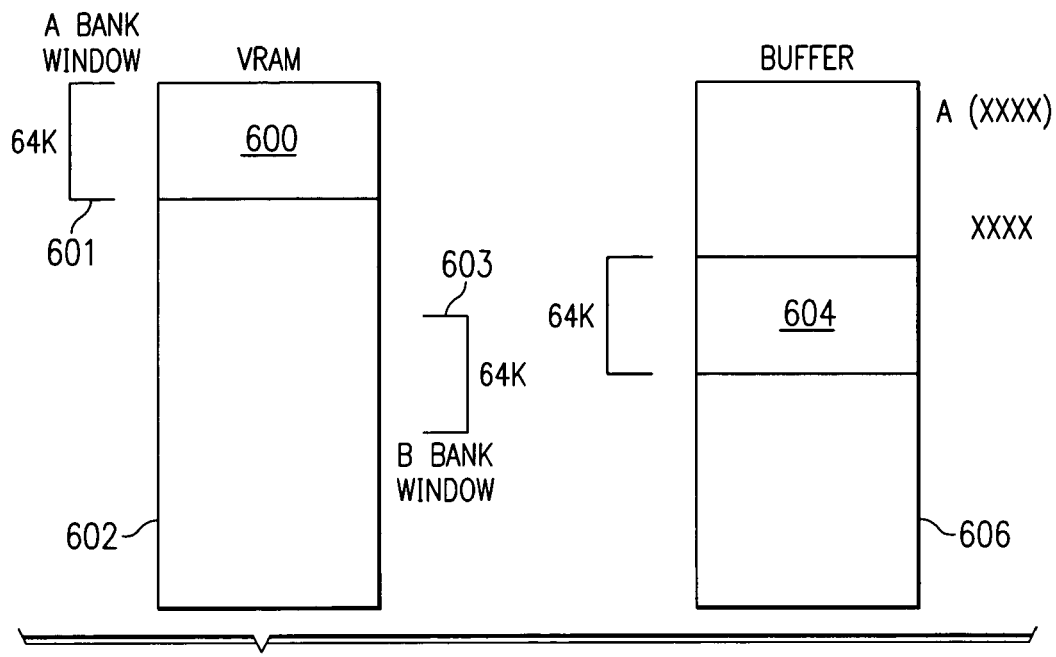
FIG. 6 is a diagram depicting the saving of data from VRAM to a buffer in accordance with a preferred embodiment of the present invention.

Thereafter, a bank save is performed (step 504). This bank save saves the content within the 64K window into a memory used by the device driver in an emulation state. In FIG. 6, a diagram depicting the saving of data from VRAM to a buffer is depicted in accordance with a preferred embodiment of the present invention. A bank save results in section 600 of VRAM 602 being saved to section 604 in buffer 606. Buffer 606 represents emulation memory that is used by the device driver. Each 64K section of the VRAM is a bank that may be identified by a bank number. In the depicted example, A bank window 601 is used for reads while B bank window 603 is used for writes in VRAM 602. In some video adapters, a single bank window may be employed instead of the two shown in FIG. 6.

A determination is then made as to if additional data in memory is present within the adapter that has not been saved (step 506). This step is done using the information describing the mode that is provided by the VESA BIOS and the data also provided of the VESA BIOS at save time of the adapter's current state from step 500. If additional memory is present, the process returns to step 502 to shift the 64K window through bank setting to the next bank containing an unsaved portion of memory. Otherwise, the process performs a VGA register save (step 508). This step saves the subset of the SVGA register set which provides VGA hardware compatibility. This step is performed in case the VESA BIOS provides a faulty, incomplete, or absent register save. This step serves as a supplement to the VESA BIOS call made in step 500. Supplementing calls are employed in this process because in practice, VESA BIOS calls may be faulty, incomplete, or occasionally absent.

Figure 7:
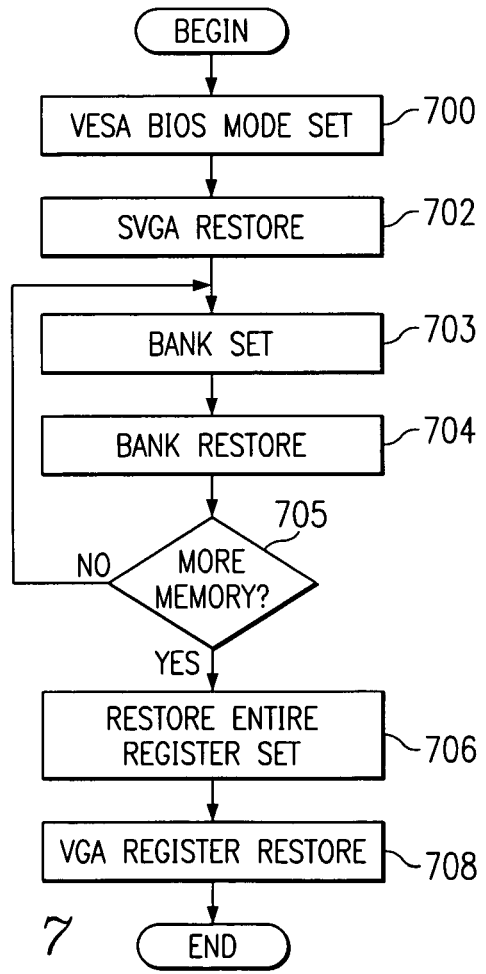
FIG. 7 is a flowchart of a process for restoring the contents of a video graphics adapter in accordance with a preferred embodiment of the present invention.

With reference now to FIG. 7, a flowchart of a process for restoring the state of a video graphics adapter is depicted in accordance with a preferred embodiment of the present invention. In the depicted example, the process in FIG. 7 is coded within the virtual video device driver using calls or commands that are common to VESA video adapters. The process may be implemented for other types of device drivers to handle devices that have common calls or commands to the hardware. The process begins by performing a VESA BIOS mode set (step 700). This step serves as a substitute or supplement to step 702 in case step 702 is faulty, incomplete, or absent. The particular call on this step is always implemented and is seldom faulty or incomplete. Thereafter, an SVGA register restore is performed to restore the registers in the adapter using a VESA BIOS call (step 702). A bank set is performed to select a window within the VRAM in which data is to be restored (step 703). A bank restore occurs (step 704). This step occurs by copying the contents from the buffer in the emulation memory back into the VRAM in the adapter. Next, a determination is made as to whether additional memory is present within the VRAM that needs to be restored (step 705). If additional memory is present for restoring, the process returns to step 703. Otherwise, the entire SVGA register set is restored again (step 706) with the process terminating thereafter. Step 706 is performed using a VESA BIOS command. A VGA register restore, using hardware commands in the device driver, is performed, which is a supplement or substitution in case the BIOS call in step 706 is faulty, incomplete, or absent (step 708).

Turning now to FIGS. 8A-8C, illustrations of psuedo code employed in a device driver when an application switches to the foreground is depicted in accordance with a preferred embodiment of the present invention. Section 800 is used to save the client machine CPU register state, save the video BIOS data area, and set up a VGA or possible VESA BIOS call to set the current client video mode in order to restore the video device manager's state. Section 802 includes code for setting up a VESA BIOS call to set the logical scan line length for the adapter. This section is useful for a VESA BIOS not implementing a full register restore. Next, in section 804, an interrupt instruction is inserted to set up a VESA BIOS call to restore display start registers from a saved area. Next, section 806 is employed to restore an adapter's registers from a saved area. The setting of a VRAM bank number to zero through a VESA BIOS call is accomplished by section 808. Section 810 is used to set a B bank window to the next bank number for a restore. This is used in the instance an adapter uses an A bank for reading and a B bank for writing or vice versa. Section 812 contains code used to transfer data from virtual memory to the VRAM bank and to set up a BIOS call to access the next bank during this restore process. Section 814 is used to set up a VESA BIOS call to set the B bank number to the adapter's current bank number.

The code in section 816 is employed to set up a VESA BIOS call to restore the adapter register set to clean up registers that may have changed during the restoring of the VRAM banks. In section 818, code is present for finishing the foreground switch. This portion of the code restores the VGA register state, restores client machine CPU register state, and video BIOS data. In addition, section 818 also switches trapping behavior to shift the device driver transparent state from an emulation state.

With reference now to FIGS. 9A-9D, illustrations of psuedo code employed in a device driver when an application switches to the background is depicted in accordance with a preferred embodiment of the present invention. The code in section 900 is employed to save the VGA register state, client machine CPU register state, and video BIOS data. In addition, this code also sets up a VESA BIOS call to obtain the size of the adapter's SVGA registers save area. In section 902, the SVGA registers save area size is used to save the SVGA registers using a VESA BIOS call. Next, a VESA BIOS call is used to obtain a VRAM bank number in section 904. Section 906 is used to obtain the adapter's display start offset through a VESA BIOS call.

In section 908, the return display start values are saved and a VESA BIOS is set up to obtain a VRAM A bank number. The A bank number is saved and a VESA BIOS call is set up to obtain the VRAM B bank number in the code in section 910. In section 912, the code saves the return B bank number and sets up a VESA BIOS call to set the VRAM bank number to zero on the first pass through this section. Subsequently, on all passes through this section, but the last one, data is transferred from the VRAM bank to virtual storage and a VESA BIOS call is set up to access the next VRAM bank. The virtual storage is also referred to as "emulation memory". On the last pass through this section, the last VRAM bank is transferred to virtual storage and a BIOS call is set up to set a VGA video mode on the real SVGA hardware, which is then ready for a new application to be switched to the foreground. The last pass through section 914 occurs when all of the banks have been copied to virtual storage (i.e, emulation memory).

If additional banks are present for saving, section 916 is employed to set up a copy of the B bank window using a VESA BIOS call with the process then returning to section 912 of the code. When the last bank has been copied to virtual memory, section 918 is employed to set up a VGA BIOS call to set up a VGA standard video mode. This portion of the code allows the next operating system component manipulating the video hardware to assume the SVGA adapter is a simple or standard VGA. In section 920, the code is used to finish a background switch in the VDM video context. The VDM is frozen when in an unemulatable (SVGA) video mode, and left unfrozen when in an emulatable (VGA) video mode.

The presently available virtual VGA video driver "VVGA" is unable to trap all otherwise untrapped I/O addresses. For example, VVGA does not know which addresses will go untrapped. MVDM design deliberately allows I/O ports of unknown device ownership to go untrapped to allow native DOS drivers to work (essentially as always "foreground" from the point of view of the specific device ownership), even when no OS/2 drivers for that (unknown) device are installed. In this case, OS/2 drivers may not exist for this device. Although trapping in the depicted example is described with respect to OS/2, these processes of the present invention may be applied to other operating systems.

This problem with VVGA trapping of I/O ports is addressed by a preferred embodiment of the present invention that describes an extended basic adapter type, called "Generic SVGA", which includes "all I/O ports reserved for video" but not part of the VGA standard, as well as all the I/O ports used by the basic adapter type "VGA Standard". The VGA Virtual Video driver is extended to become the Generic SVGA Virtual Video driver by having it always trap "all I/O ports reserved for video" and optionally trap additional ports, which may be discovered by the end user or provided by the user's available technical support in accordance with a preferred embodiment of the present invention. The phrase "all I/O ports reserved for video" means is described in more detail below.

In addition, the VGA Virtual Video also is extended by adding four additional "DEVICE=" (user installation) options. "/TRAP=xxxx-yyyy" and "/TRAP10=xxx-yyy", where "xxxx" and "yyyy" are 16 bit hex numbers, "xxx" and "yyy" are 10 bit hex numbers, will cause Virtual Video to trap additional I/O ports which are not "reserved for video". Where the ranges specified overlaps already trapped ports, it will have no additional effect. The /TRAP10 option will cause trapping of all ports equal to the numbers in all specified range. The /TRAP10 option will cause trapping of all ports equal to the numbers in the specified range mod 0400. The /TRAP10 option makes convenient the handling of older boards and chips which did not decode the top 6 bits. "/NOTRAP=xxxx-yyyy" and "/NOTRAP10=xxx-yyy", would be similar options to disable some default range trapping.

Also, the VGA Virtual Video Device Driver is extended by trapping those port ranges specified by the PCI bus Configuration Header (if any) for the currently enabled video adapter. The Virtual Video Device Driver will obtain this Configuration Header information through PCI BIOS calls. In defining the phrase "all I/O ports reserved for video", most of the addresses commonly used by historical video devices are included.

The following table shows input/output ports usage for the common video adapters supported by the OS/2 shrink wrap package, as well as ports denoted as "reserved", or otherwise similarly denoted or implied. In particular, the "T" column which indicates what is included in "all I/O ports reserved for video" but not part of the VGA standard, and thus composes the extended part of the basic adapter type called "Generic SVGA" of the present invention over the basic adapter type "VGA Standard".

TABLE

| Low–High | TPAR | | | | Video Adapter Usage/Standard Reservation |
|---|---|---|---|---|---|
| 01CE–01CF | T | | | | ATI Mach 32 |
| 02EA–02ED | T | | | | ATI Mach 32 DAC |
| 03B0–03BF | | P | A | | MDA |
| 03B0–03B3 | T | P | | | MDA Not Used |
| 03B4–03B5 | | P | | R | MDA CRT |
| 03B6–03B7 | T | P | | | MDA Not Used |
| 03B8–03B8 | | P | | U | MDA Mode |
| 03B9–03B9 | | P | | U | MDA Reserved |
| 03B9–03B9 | | | | U | MDA Light Pen Reset |
| 03BA–03BA | | P | | R | MDA Status |
| 03BA–03BA | | | | R | EGA Feature Write |
| 03BB–03BB | | P | | R | MDA Reserved |
| 03BB–03BB | | | | R | MDA Light Pen Set |
| 03BC–03BE | | P | | | MDA Parallel Port |
| 03BF–03BF | | P | | W | MDA Not Used |
| 03BF–03BF | | | | W | MDA Hercules Compatibility |
| 03C0–03CF | | P | | | ??? Reserved |
| 03C0–03CF | | | A | | EGA |
| 03C0–03C1 | | | | R | EGA ATC |
| 03C2–03C2 | | | | R | EGA Misc Out Write |
| 03C3–03C3 | | | | R | VGA VSE |
| 03C4–03C5 | | | | R | EGA SEQ |
| 03C6–03C6 | | | | R | EGA Compaq |
| 03C6–03C9 | | | | R | VGA DAC |
| 03C6–03C9 | | | | R | VGA DAC |
| 03CA–03CA | | | | U | EGA GDC Pos 2 |
| 03CB–03CB | T | | | | ATI EGA Index |
| 03CB–03CB | T | | | | Tseng TSegment TSelect |
| 03CC–03CC | | | | R | EGA GDC Pos 1 |
| 03CD–03CD | T | | | | ATI EGA Data |
| 03CD–03CD | T | | | | Tseng TSegment TSelect 2 |
| 03CE–03CF | | | | R | EGA GDC |

TABLE-continued

| Low–High | TPAR | | | Video Adapter Usage/Standard Reservation |
|---|---|---|---|---|
| 03D0–03DF | | P | A | CGA CRT (don't cares) |
| 03D0–03D1 | T | P | | CGA CRT (don't cares) |
| 03D2–03D3 | T | P | | CGA CRT (don't cares) |
| 03D4–03D5 | | P | R | CGA CRT (standard) |
| 03D6–03D7 | T | P | | CGA CRT (don't cares) |
| 03D6–03D6 | | | | OS2 Virtual Video Reserved |
| 03D8–03D8 | | P | U | CGA Mode Select |
| 03D9–03D9 | | P | U | CGA Color Select |
| 03DA–03DA | | P | R | CGA Color Status |
| 03DA–03DA | | | R | EGA Feature Write |
| 03DB–03DB | | P | R | CGA Light Pen Reset |
| 03DC–03DC | | P | U | CGA Light Pen Set |
| 03DD–03DF | T | | | CGA Unused |
| 03DD–03DD | T | | R | Orchid Clock Select |
| x2E8–x2E9 | T | | | 8514/S3/ATI Mach32 xx = 0 mod 4 many used |
| 46E8–46E8 | | | | VGA VSE Alternate |
| x2EA–x2EB | T | | | S3 864 responds w/0 xx = 0 mod 4 many used |
| x2EC–x2EF | T | | | ATI Mach64 Original xx = 0 mod 4 many used |
| x6E8–x6E8 | T | | | ATI Mach64 Original x = 4/5/6/7 |
| x2EE–x2EF | T | | | ATI Mach32 xx = 0 mod 4 many used |
| 23C0–23CF | | | | WD C24/C31/C33 Accelerator ports |
| 43C0–43CF | | | | IBM Thinkpad 560/Trident Clock |
| 83C6–83C6 | | | | IBM Thinkpad 560/Trident |
| x3C6–x3C6 | | | | EGA Compaq xx = 03/07/0B/0F |
| x3C0–x3C3 | T | | | S3 864 responds w/0 xx = 0 mod 4 many used |
| 0D00–0D01 | | | | IBM Thinkpad Config |
| 1FEE–1FEE | | | | IBM Thinkpad SMAPI |
| 21x0–21xF | T | | | IBM XGA/Tseng ET4000W32 x = 0–7 depending on slot |

TPAR ==
T == Propose to trap for "GSVGA" but do not yet for "VGA"
P == IBM PC Technical Reference Manual
A == IBM PC AT Technical Reference Manual
R == OS/2 Resource Manager reports (through RMVIEW) for VGA usage
W == Wrongly identified as Parallel Port
U == Unreported
CGA == Color Graphics Adapter
EGA == Enhanced Graphics Adapter
MDA == Monochrome Display Adapter The VGA is basically a superset of the EGA which is in turn a superset of the MDA and EGA combined. On each individual computer, the VGA Virtual Video Device Driver (VSVGA.SYS) only traps those ports "identified as VGA", plus "identified as CGA, MDA, EGA, or Hercules", on each individual computer the historic SVGA virtual video device drivers have the same ports as the VGA driver, plus those ports identified as used by the particular adapter for which it is presently providing support. "Identified as VGA", in this case means that it actually has an identified VGA function, and does not include those ports identified merely as reserved.

Ports 03D0-03DF are clearly listed in an I/O port usage table in the "IBM Technical Reference Personal Computer AT" manual, September 1985 6280070 S229-9611-00 6139362 as used by the CGA. This reference also is referred to as the "IBM PC AT Technical Reference Manual" and is available International Business Machines Corporation. However, ports 03D0-03D3, and 03D6-03D7 are less clearly "in use", when referring to the rest of the manual. These ports appear to be alias addresses for the well documented usage of 03D4-03D5. If so, then these addresses could not be used for anything else. An arbitrary check of the usage of these ports by some adapters, shows that these ports are sometimes aliases of 03D5, but are still definitely in use by the adapters. This data suggests that these port addresses must necessarily be reserved for video, and, therefore, trap these as Generic SVGA ports.

Ports 03B0-03BF are clearly listed in an I/O port usage table in front of the IBM PC AT Technical Reference Manual as used by the MDA. However, ports 03B0-03B3, and 03B6-03B7 are less clearly "in use", when referring to the rest of the manual. Similarly to the 03D0-03DF range, this data is interpreted to mean that these ports are reserved for video, and therefore trap these as Generic SVGA ports.

Port 03BF is identified by the OS/2 program RMVIEW as used by the monochrome display printer (parallel) port, which definitely does indeed use ports 03BC-03BD. This RMVIEW identification does not seem realistic, since 03BF was used by Hercules Monochrome Graphics cards for other purposes. Several other ports, indicated by a "U" in the "R" column above, are not identified by RMVIEW (an OS/2 I/O port usage viewing software tool) as used by the VGA, and but should be so identified. These ports include ports which are/were commonly used by many SVGA adapters which also provided CGA, MDA (also called Monochrome Display and Printer Adapter or MDPA), or Hercules Monochrome Graphics compatibility. These ports also include the EGA/VGA GDC Pos 2 register. In addition, a less but perhaps similarly strong case should be made for identifying those addresses which we chose here to unconditionally trap for Generic SVGA. Ports 03C0-03CF are clearly listed in an I/O port usage table in the front of the IBM PC AT Technical Reference Manual in use, although they differ in the specifics. This is mostly due to time frame. The IBM PC preceded the EGA, while the EGA preceded the IBM PC AT.

The IBM PC AT Technical Reference calls indicate this range is used by "EGA". This is interpreted to mean that these ports are reserved for video, in particular the otherwise undefined 03CB and 03CD. Therefore, the device driver of the present invention would trap these as Generic SVGA ports. This would also be supported by the use by ATI Technologies, Inc. located in Thornhill, Ontario, Canada and Tseng Labs, Inc. located in Newton, Pa. of these addresses on their video cards.

The Generic SVGA Virtual Video Device Driver traps 02E8-02EF only if the BIOS does not indicate this range was in use by the COM3, or other, serial port. This usage of the range is easy to check because the ROM BIOS records the port addresses used for COM3 at a standard address range.

A computer with the PCI S3 864 which was tested and responded to whole word addresses. S3 adapters are available from S3 Incorporated located in Santa Clara, Calif. So even though the S3 documentation talks about x2E8-x2e9, the real range is x2E8-x2EB. More information on S3 adapters may be found in "86C928 GUI Accelerator" July 1993 DB02-D and "Trio32/Trio64 Graphics Accelerators" November 1994 DB014-A. The computer with the PCI S3 864 which we tested also responds to all addresses 03C0-03C3 mod 0400, probably to catch any potential access to the 03C3 port. The motherboard for this computer had an ATI Mach 32 built in, so the response to these port addresses may have been do to the ATI Mach 32 instead of the PCI S3 864. This is especially likely since 03c3 is the VSE (Video Subsystem Enable) port address which enables or disables the rest of the I/O port address decoding for a VGA! An ATI Mach 32 adapter is available from ATI Technologies, Inc. in Thornhill, Ontario, Canada. All things considered, it seems possible that any port in ranges 03B0-03DF mod 400 or 02E8-02ED mod 0400 may have compatibility problems if it is not used as a video port. Such compatibility problems may be limited to non-PCI and possibly "older" PCI adapters. If the Generic SVGA Virtual Video traps these addresses as "reserved for video", then probably it should do so conditionally on the absence of a PCI bus. This is one situation where it seems that the "requirements" conflict. S3 and ATI are popular brand names which always use ranges like these, but room may be made in the I/O space for PCI devices to have their up-to-256 consecutive byte I/O space reservations. This is a reason for having a /NOTRAP option.

Ports 21x0-21xF, where x=0-7 depending on slot, were used on IBM XGA and Tseng ET4000W32. The same adapter is available from Tseng Labs, Inc. located in Newton, Pa., and more information on the adapter may be found in "ET400/W32p Graphics Accelerator Data Book" c/r 1994. Since the IBM XGA usage was IBM approved and wide spread, and at least the Tseng ET4000W32 usage is present day, this is interpreted to mean that thes3e ports are reserved for video. At least in this case, the complete set of port addresses is confined to one contiguous 128 address block.

Turning now to FIG. 10, a high level flowchart of a process for capturing I/O ports is depicted in accordance with a preferred embodiment of the present invention. The process begins by receiving an application I/O (step 1000). The application I/O causes a hardware trap to be initiated through a port MVDM I/O hook (step 1002). The application I/O is treated as an illegal instruction by the processor with the I/O being routed to a trap handler in the MVDM. A determination is then made as to the port address that is being accessed by the I/O (step 1004). If the port address is a VGA index or a VGA simple address, a VVVGA STD-PORT I/O hook is employed to handle the I/O (step 1006).

If the port address is a VGA data address, a VVVGA port I/O hook is used to trap the application I/O (step 1008). On the other hand, if the port address is a PCI address or a generic SVGA address, a VVPCI Port hook is employed to trap the application I/O (step 1010). In each case, after the application I/O is trapped, the application then continues its processing step (1012).

A more detailed description illustrated in FIG. 11 is shown below in FIGS. 11A-11B, which are diagrams of pseudo code used to capture port address is depicted in accordance with a preferred embodiment of the present invention. The process begins in section 1100 by initializing for a virtual video device driver called by MVDM at start of each virtual DOS machine (VDM). In section 1102, client I/O instructions that generate a hardware track are handled by this portion of the code. Handlers are generally registered at the start of the VDM. Video port hooking is enabled in the background state and disabled in the foreground state. With non-video hardware, other processes may be employed to hook or capture I/O instructions based on device driver requirements and signification. A registered hook handler for VGA standard I/O port addresses is employed in section 1104. A more complicated handler may be employed if the I/O port is not connected to a simple register. For example, if a pair of I/O ports for an index and data register array are present, each I/O port address may have its own unique and differently coded handler to handle unusually behaving ports. In section 1106, a registered hook handler for a VGA data I/O port address is employed as part of an index and data port handler pair. The index port handler is usually a VGA standard port I/O hook, such as the one employed in section 1104.

Section 1108 implements a PCI port I/O hook, which is registered by the virtual video device driver for a list of port addresses by the PCI BIOS in the video adapter. This section provides an emulation that predicts how a typical port works, but does not always provide an absolutely correct emulation although it almost always suffices for emulated VGA modes. Such a situation is not true of SVGA modes. As a result, the application is frozen in VESA modes in the background so that the video adapter is not incorrectly emulated. The emulation state variables employed in this section are not used to restore adapter contents. Instead, VESA BIOS calls are used to restore important registers.

With reference now to FIGS. 12A-12C, a diagram of pseudo code used to set modes are depicted in accordance with a preferred embodiment of the present invention. Section 1200 is employed to determine whether a mode set has occurred. Section 1202 is employed to set up VESA mode inquiry while section 1204 obtains VESA mode information from the mode information block and copies this information to the VDM's VESA mode information structure. Thereafter, section 1204 sets up to perform the actual VESA BIOS mode set to the VESA mode. Thereafter, in section 1206, a post clean up after VESA BIOS set is performed. Thereafter, client interrupt 10 is continued in section 1208, and a return of the client program is performed in section 1210. In section 1214, a mode update is performed by determining the current mode dimensions. The dimensions are used to determine how much VRAM to save and restore for emulation switching and how to draw the current VRAM contents as a picture in a desktop window.

Thus, the present invention provides and improved method and apparatus for handling a number of different types of devices, such as various types of video adapters, using a generic device driver. The present invention provides this advantage through saving and restoring information located on a device using BIOS calls that are common to a number of different types of devices handled by the device driver, instead of coding multiple specific virtual video versions for specific hardware using direct hardware instructions. These calls are made through the device driver. In addition, the present invention traps I/O port ranges that are identified as possibly being used by the device.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted example is shown with respect to an OS/2 operating system, the processes and features may be applied to other types of operating systems, such as, for example, Windows NT from Microsoft Corporation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A device driver, in a computer readable storage medium and functionally operable in conjunction with a data processing system, suitable for communication with a plurality of different types of devices when functionally operated in conjunction with the data processing system, wherein each of the plurality of different types of devices conform to a common standard, the device driver comprising:

identification means for identifying all input/output ports relating to a basic device type common to the plurality of different types of devices;

interrogation means using commands conforming to the standard and common to the plurality of different types of devices for polling a device within the plurality of different types of devices to obtain input/output ports used by the device in addition to the input/output ports identified by the identification means; and trapping means for trapping input/output ports identified by the identification means and the interrogation means;

wherein additional input/output ports used by the basic device type are identifiable during installation by the device as removed from the basic device type and unused by the device through a user option.

2. The device driver of claim 1, wherein the device includes a peripheral component interconnect (PCI) basic input/output system (BIOS) and wherein the commands conforming to the standard used in the interrogation means are PCI standard BIOS calls.

3. The device driver of claim 2, wherein the device is a video adapter and the basic device type is an abstract super video graphics adapter (SVGA) including a standard video graphics adapter (VGA) and additional non-standard VGA input/output ports used by the basic device type.

4. The device driver of claim 1, wherein additional input/output ports used by the basic device type are identifiable during installation of the device by a user option.

5. A method in a computer used by a device driver for communication with a plurality of different types of devices, wherein each of the plurality of different types of devices conform to a common standard, the method comprising computer implemented steps of:

identifying all input/output ports relating to a basic device type common to the plurality of different types of devices;

polling a device within the plurality of different types of devices, using commands conforming to the standard and common to the plurality of different types of devices, to obtain input/output ports used by the device in addition to the input/output ports identified by the identifying step; and trapping input/output ports identified by the identifying step and the polling step;

wherein additional input/output ports used by the basic device type are identifiable during installation by the device as removed from the basic device type and unused by the device through a user option.

6. The method of claim 5, wherein the device includes a peripheral component interconnect (PCI) basic input/output system (BIOS) and wherein the commands conforming to the standard used in the polling step are PCI standard BIOS calls.

7. The method of claim 6, wherein the device is a video adapter and the basic device type is an abstract super video graphics adapter (SVGA) including a standard video graphics adapter (VGA) and additional non-standard VGA input/output ports used by the basic device type.

8. The method of claim 5, wherein additional input/output ports used by the basic device type are identifiable during installation of the device by a user option.

9. A system for communication with a plurality of different types of devices, wherein each of the plurality of different types of devices conform to a common standard, the system comprising:

a processor;

a memory connected to the processor;

identification means for identifying all input/output ports relating to a basic device type common to the plurality of different types of devices;

interrogation means using commands conforming to the standard and common to the plurality of different types of devices for polling a device within the plurality of different types of devices to obtain input/output ports used by the device in addition to the input/output ports identified by the identification means; and trapping means for trapping input/output ports identified by the identification means and the interrogation means;

wherein additional input/output ports used by the basic device type are identifiable during installation by the device as removed from the basic device type and unused by the device through a user option.

10. The system of claim 9, wherein the device includes a peripheral component interconnect (PCI) basic input/output system (BIOS) and wherein the commands conforming to the standard used in the interrogation means are PCI standard BIOS calls.

11. The system of claim 10, wherein the device is a video adapter and the basic device type is an abstract super video graphics adapter (SVGA) including a standard video graphics adapter (VGA) and additional non-standard VGA input/output ports used by the basic device type.

12. The system of claim 9, wherein additional input/output ports used by the basic device type are identifiable during installation of the device by a user option.

* * * * *